Dec. 3, 1929.　　　R. S. CROSBY ET AL　　　1,737,876

MACHINE FOR APPLYING NUTS TO SCREWS, BOLTS, AND STUDS

Filed Aug. 31, 1928　　　2 Sheets-Sheet 1

INVENTORS.
Reuben S. Crosby &
Frank E. Newton
by Harry P. Williams
atty.

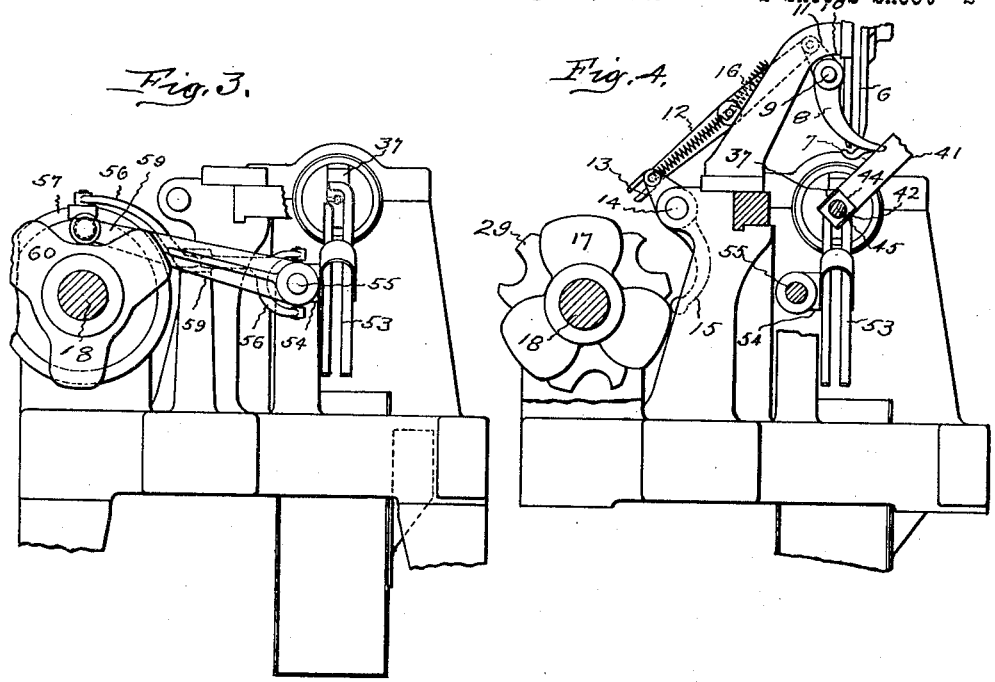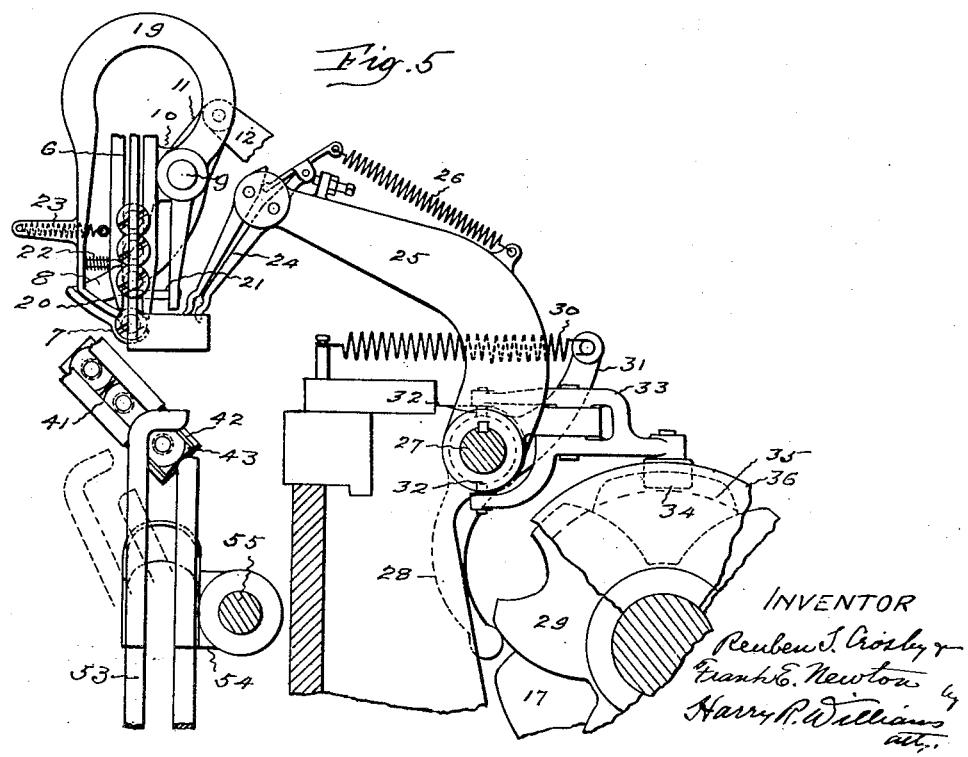

Patented Dec. 3, 1929

1,737,876

UNITED STATES PATENT OFFICE

REUBEN S. CROSBY AND FRANK E. NEWTON, OF HARTFORD, CONNECTICUT; SAID CROSBY ASSIGNOR TO SAID NEWTON

MACHINE FOR APPLYING NUTS TO SCREWS, BOLTS, AND STUDS

Application filed August 31, 1928. Serial No. 303,184.

This invention relates to a machine for turning screws into nuts. The term screws used in this specification is to be understood as including not only screws but bolts, threaded studs and the like articles. A machine of this class is illustrated and described in the copending application of R. S. Crosby, Serial No. 237,025, filed Dec. 1, 1927. In the machine of this prior application the screws and nuts are fed into alignment and the nuts push the screws into a rotating chuck by which the screws are turned into the nuts. After the screws have been applied to the nuts they are merely dropped out of the machine.

The objects of the present invention are to provide means which will positively control the feeding of the screws from the chute; will insure the accurate insertion of the screws into the chuck; and will separate the screws that fail to receive nuts from those to which the nuts are properly applied, whereby the machine may be run at high speed and the product sorted.

In the present conception a gate and a cut-off allow but one screw at a time to be dropped upon a carrier which transfers the screw into position to be picked up by fingers that swing down and carry the screw into alignment with the chuck and then move transversely and pass the head of the screw into the jaws of the chuck. The nuts are fed one at a time to a carrier which advances the nut to the rotating screw so that the screw will turn into the nut. The nut carrier then withdraws and the chuck jaws open. However, before the chuck jaws are opened spaced fingers are swung up so as to embrace the screw and then as the chuck jaws open these fingers are drawn back transversely and then swung out. If the screw has a nut properly applied the screw slides down the runway formed by the fingers hanging by the nut and is delivered to a chute that leads to a receiving receptacle. Should the screw fail to receive a nut the screw will drop from the fingers and not slide down to the chute which only receives the nutted screws.

Figure 1:
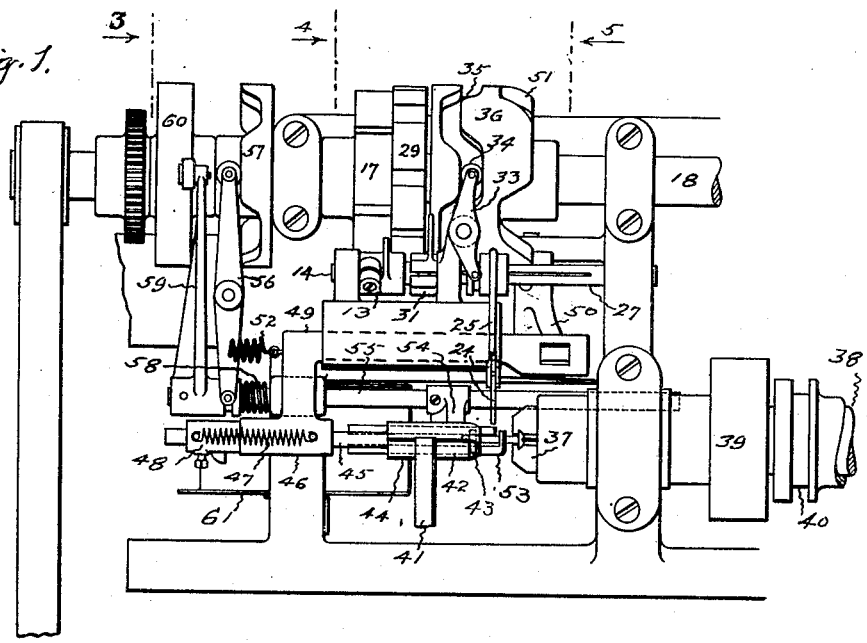
Figure 2:
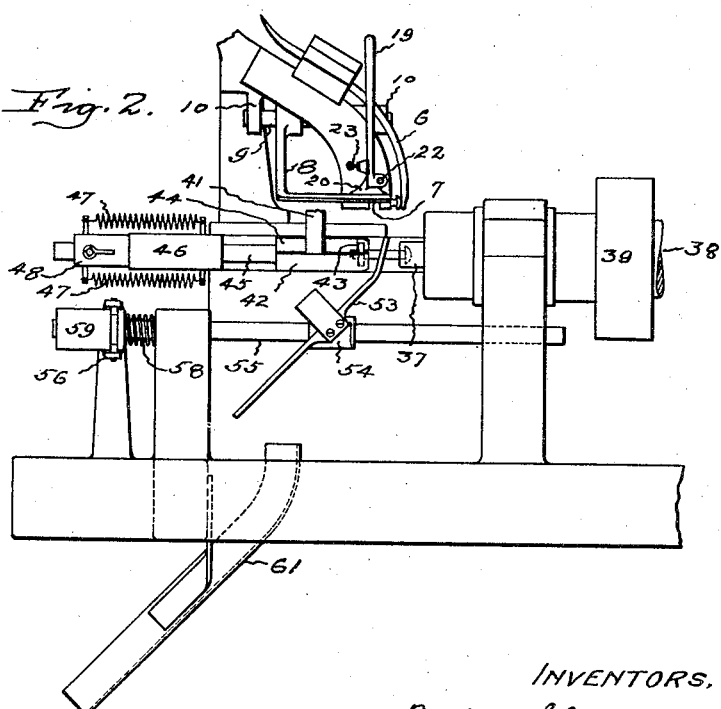

In the accompanying drawings Fig. 1 is a plan view showing so much of the nutting machine as is pertinent to this invention. Fig. 2 is a front elevation showing a part of the screw control and the sorting mechanism of the machine. Fig. 3 is a vertical section looking toward the sorting mechanism, the section being taken on approximately the dotted line 3 on Fig. 1. Fig. 4 is a vertical section on approximately the dotted line 4 on Fig. 1. Fig. 5 is a section on larger scale taken on approximately the dotted line 5 on Fig. 1 showing the screw feed controlling and transfer mechanisms, and the sorting fingers.

Screws from the source of supply slide down the curved chute 6 hanging by their heads and turn into a horizontal position at the lower end of the chute. Movable under the bottom of the chute is a carrier 7 designed to receive the lowest screw. This carrier projects from the end of an angular rocker arm 8 that is fastened to rock shaft 9 which is mounted in brackets 10 attached to the chute, Figs. 2, 5. Fastened to this rock shaft is a rocker arm 11 that by a link 12 is connected with the upper end of a lever 13 which is pivoted at 14 and has its lower end 15 held by the tension of a spring 16 in engagement with the cam 17 on the main cam shaft 18, Fig. 4. By this mechanism the lowest screw is taken from the bottom of the chute and carried a short distance toward the rear of the machine.

Fastened to the rock shaft 9 so as to oscillate therewith and with the carrier is a yoke 19. The lower end of the front limb of this yoke is shaped to form a gate 20 that, when the carrier is under the end of the chute, stands in front of the opening at the bottom of the chute, but when the carrier swings back this gate swings under and closes the bottom of the chute and prevents a screw from dropping therefrom. The edge of the gate may engage with the screw in the carrier and thus insure the transfer of the screw with the carrier. At the lower end of the back limb of the yoke is an escapement pin 21 that when the gate is forward projects into the chute and supports the screws and that when the yoke swings back and the gate closes the runway, swings out and allows a screw to drop onto the gate. Extending from the front limb of the yoke is a spring escapement pin 22 that is adapted to project into the chute and support the screws when the pin 21 swings out and allows a screw to drop onto the gate. A spring 23 tends to draw the yoke so that the pin 22 will project into the chute and support the screws, Fig. 5.

By this control means the screws are prevented from clogging or jamming in the chute, and but one screw at a time is allowed to feed to the carrier, which screw is positively controlled so that it will be properly fed with the machine running at high speed.

When the carrier swings back it carries a screw into position to be grasped by a pair of fingers 24 which are pivotally mounted at the upper end of a lever 25 and that are normally closed by a spring 26, Fig. 5. This lever is splined to a rock shaft 27 so that it will oscillate with the shaft and may be moved longitudinally on the shaft. Fastened to the shaft 27 is a rocker arm 28 that is engaged by a cam 29 on the main cam shaft. A spring 30 connected with an arm 31 fastened to the shaft holds the arm 28 in engagement with the cam, Fig. 5. This cam is shaped to, at the proper times, cause the fingers 24 to pick up a screw from the carrier and carry it into line with the axis of the chuck.

The hub of the lever 25 is grooved and extending into this groove are pins 32 at the front end of a forked lever 33. The rear end of this lever has a roll 34 that lies in a cam groove 35 in a cam disk 36 on the main cam shaft, Figs. 1, 5. After the fingers have picked up a screw and carried it into line with the chuck this cam causes the fingers to move transversely and carry the screw head into the chuck jaws, after which the fingers are moved back and swung up into the plane of the carrier at the end of the screw chute.

The chuck 37, Figs. 1, 2, 3, may be any common opening and closing jaw type, whose operating mechanism is well known to those skilled in the screw machine art, consequently it is not illustrated in detail. It is sufficient to mention that the chuck is carried at the end of a rotating spindle 38 provided with a driving pulley 39, Figs. 1, 2. The chuck is opened and closed by the movement of the grooved collar 40, Fig. 1, in the ordinary way. When a screw is presented to the chuck by the transfer fingers the jaws are closed upon the head so that the screw will rotate with the chuck.

The nuts slide down a chute 41 from the source of supply to, a carrier 42 which moves longitudinally below the chute in alignment with the chuck. At its forward end this chuck has an opening 43 which, when the carrier is retracted lies below the open end of the chute so as to receive a nut. When the carrier moves forward its flat surface 44 closes the opening from the chute. The carrier has a shank 45 which is movably fitted in a slide 46 and is normally pulled forward by a pair of springs 47 connected between the slide and a collar 48 attached to the shank, Fig. 2. The slide has a section 49 that has a longitudinal movement in a way in the frame and is moved forward at the proper times by a lever 50 and cam 51 and is retracted by a spring 52, Fig. 1. By this means a nut is carried forward into engagement with a rotating screw that is held by the chuck, so that the screw will be turned into the nut. When the carrier is retracted the nut remains on the screw.

The separator fingers 53 which are spaced apart so as to form a track between them, are attached to a bracket 54 that is fastened to a shaft 55, Fig. 5. This shaft is mounted in the frame so that it can be rotated and also reciprocated. The shaft with the spaced fingers is moved forward by the yoked end of a lever 56 and a cam 57 and it is retracted by a spring 58, Fig. 1. Fastened to the shaft 55 is one end of a rocker lever 59 that has its other end engaged by cam 60 which is shaped to at the proper time cause the shaft and the fingers to oscillate. The cams 57 and 60 are timed to cause the fingers to move forward and swing up so as to embrace a screw held by the chuck. When a screw has been turned into a nut and the chuck jaws are opened and the head of the screw is released, the fingers move backward and engaging the nut withdraw the head of the screw a short distance from the chuck, after which the fingers swing forward out of the path of the nut carrier.

If a nut has been applied to a screw the screw slides down the track formed by the spaced fingers hanging by the nut and drops from the end of the fingers into a chute 61 that delivers the assembled article to the desired receptacle. However, should the screw fail to receive a nut it falls by gravity out of the fingers when the chuck jaws are opened and does not travel down the fingers. Thus the properly assembled product is surely separated from the screws which have not received nuts. By reason of this sorting mechanism considerable time, labor and expense are saved, as the properly nutted screws may be delivered directly into the containers in which they are to be sold, thus eliminating the employment of sorters, and with the screw feed control mechanism which is described the screws can be fed rapidly and will be accurately located in the chuck so that practically all of the screws will receive nuts, but should the supply of nuts give out or the supply of screws be exhausted the separate parts will not be delivered to the packages or receptacles containing the properly assembled articles.

The feeding mechanism described is not claimed herein, it being claimed in our application Serial No. 375,398, filed July 2, 1929, the subject matter of which was divided out of this application.

The invention claimed is.

1. In a machine for applying nuts to screws the combination with a chuck for receiving and rotating a screw and a reciprocatory carrier for presenting a nut to a screw held by the chuck, of a runway comprised of spaced fingers adapted to embrace a screw held by the chuck, said fingers being spaced apart a greater distance than the diameter of the screw shank but less than the diameter of the nut, and means for moving said fingers into and out of alignment with the rotating chuck and reciprocating carrier.

2. In a machine for applying nuts to screws the combination with a chuck for receiving and rotating a screw and a reciprocatory carrier for presenting a nut to a screw held by the chuck, of a runway comprised of fingers spaced apart a greater distance than the diameter of the screw shank but less than the diameter of the nut, and means for oscillating said fingers into and out of alignment with the rotating chuck and reciprocating carrier.

3. In a machine for applying nuts to screws the combination with a chuck for receiving and rotating a screw and a carrier for presenting a nut to a screw held by the chuck, of a runway comprised of fingers adapted to embrace a screw held by the chuck, said fingers being spaced a greater distance than the diameter of the screw shank but less than the diameter of the nut, a shaft supporting said runway, and means for reciprocating said shaft.

4. In a machine for applying nuts to screws the combination with a chuck for receiving and rotating a screw and a carrier for presenting a nut to a screw held by the chuck, of a runway comprised of spaced fingers adapted to embrace a screw held by the chuck, said fingers being spaced apart a greater distance than the diameter of the screw shank but less than the diameter of the nut, a shaft supporting said runway, and means for oscillating and reciprocating said shaft.

REUBEN S. CROSBY.
FRANK E. NEWTON.